No. 732,278. PATENTED JUNE 30, 1903.
L. C. CUMMINGS.
NOISELESS TIRE PROTECTOR.
APPLICATION FILED JULY 14, 1902.
NO MODEL.
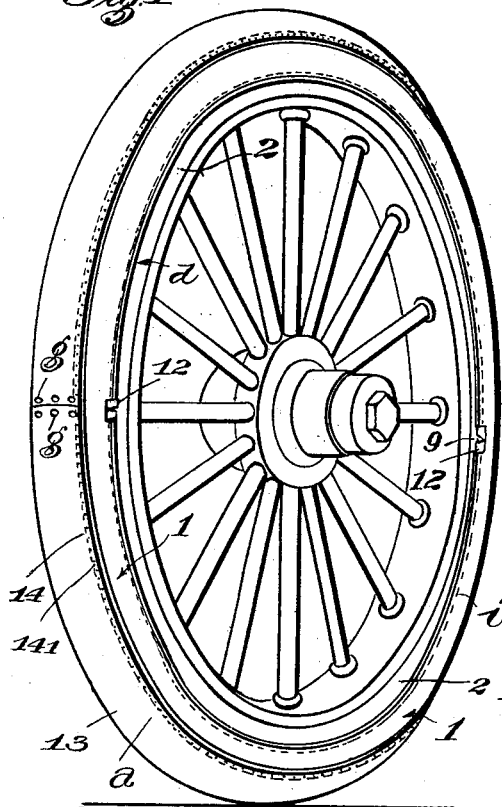
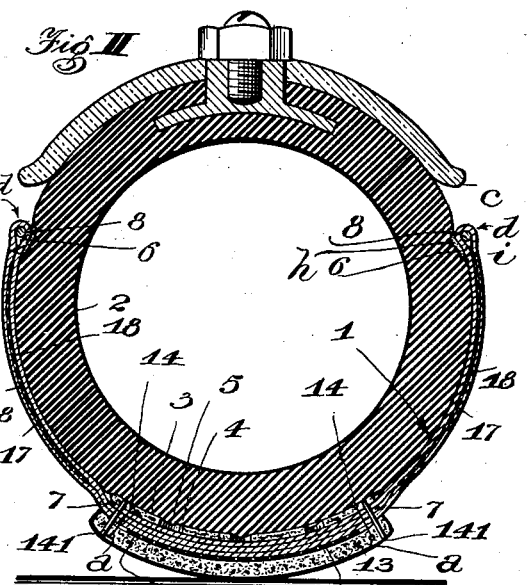
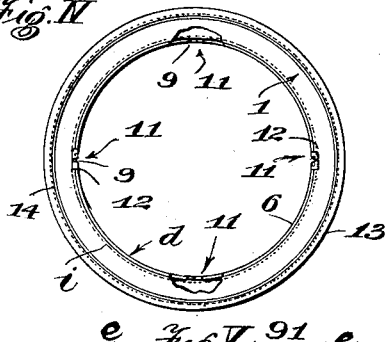
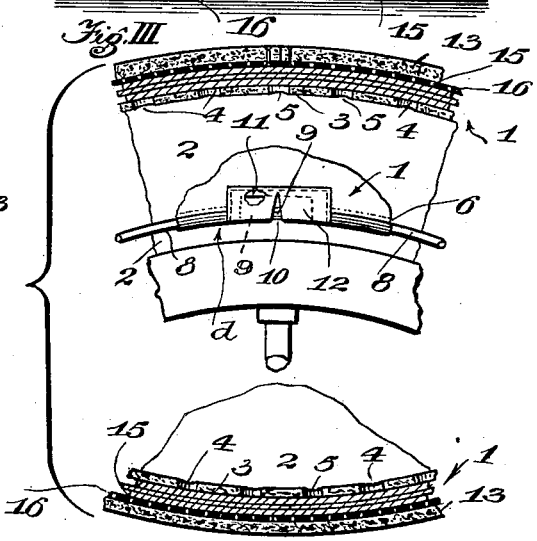
Witnesses
Edmund A. Strauss
J. Townsend
Inventor
Lincoln Clifford Cummings
by Townsend Bros
his attys.

No. 732,278. Patented June 30, 1903.

UNITED STATES PATENT OFFICE.

LINCOLN CLIFFORD CUMMINGS, OF PASADENA, CALIFORNIA.

NOISELESS TIRE-PROTECTOR.

SPECIFICATION forming part of Letters Patent No. 732,278, dated June 30, 1903.

Application filed July 14, 1902. Serial No. 115,566. (No model.)

*To all whom it may concern:*

Be it known that I, LINCOLN CLIFFORD CUMMINGS, a citizen of the United States, residing at Pasadena, in the county of Los Angeles and State of California, have invented a new and useful Noiseless Tire-Protector, of which the following is a specification.

This invention relates to improvements in resilient and noiseless tires and protectors for the tires of vehicle-wheels.

An object of the invention is to provide superior means for increasing the life of rubber, pneumatic, and other tires for vehicle-wheels and to make ordinary vehicle-wheels noiseless.

The invention is peculiarly adapted for pneumatic and other resilient tires and may be embodied in various forms.

The invention may be constructed as a separate manufacture which may be applied to the tires of wheels already made or in use and which may be removed and replaced at pleasure and which when in position on the tire of a wheel will sustain great lateral and circumferential strain without any displacement, thus providing a protector suitable for traction and other wheels of motor-carriages and other vehicles.

A further object is to strengthen pneumatic tires and to prevent any rim chafing or cutting of the same.

Another object is to prevent punctures in pneumatic tires.

Another object is to make provision whereby the resilient tires of motor-carriages and other vehicles may be painted and varnished to correspond with or harmonize with the running-gear of such vehicle at the pleasure of the constructor or owner.

Another object is to increase the traction-power of the wheels of road-motors and to avoid liability of slipping or sliding sidewise or otherwise on the road-surface.

I provide a tire with a peripheral crown of sole-leather and make provision whereby the same may be immovably secured to the peripheral crown of a resilient rubber tire, either pneumatic or solid, so that such tire is not only protected against punctures and wear, but is also strengthened and protected against rim-chafing.

Another object of the invention is to provide where necessary or desirable an armor of thin sheet metal either within the peripheral crown of the wheel or at the sides of such crown or at both the crown and sides. I do not deem it ordinarily necessary to use any armor-plates, for the reason that by combining a crown of sole-leather with a resilient tire it becomes practically impossible for the tire to be punctured under the ordinary or usual conditions of running motor road-vehicles—that is to say, the indurated resilient crown of sole-leather backed by the resilient rubber and the pneumatic cushion of the usual pneumatic tire affords a resistance to pointed instruments which is practically puncture-proof, and at the same time the resiliency of the tire is improved and the distance from the outside to the air-space is greatly increased.

The invention consists in the constructions and combinations of parts hereinafter described, and particularly pointed out in the claims.

The accompanying drawings illustrate the invention.

Figure I is a perspective view of a wheel provided with one form of my protector. Fig. II is a sectional view taken transversely across the tire of a wheel furnished with the protector. Fig. III is a fragmental view of opposite portions of the tire and protector, partly in section. Fig. IV is a broken elevation, on a reduced scale, of the protector, partly broken to show the arrangement of the turnbuckles which draw the protector taut. Fig. V is an enlarged detail of one of the joints between the straining-wires. Fig. VI is a like detail of another one of the cinch-joints.

In constructing a tire-protector in accordance with my invention I provide a base 1, which is desirably formed from flexible fibrous material, as canvas, rawhide, &c., of suitable strength to withstand the usage to which it is to be subject. The base extends entirely around the tire 2, to which it may be secured, and is desirably semicircular in cross-section, with its edges extending inward over the sides of the tire, beyond the center bulge thereof. When it is desired to secure the base to the tire, cement, shellac, or other suitable material may be applied before or as the protector is being put in position to prevent any movement of the protector on the tire. Instead of the cement or in connection therewith a piece of perforated material, as a strip of leather 3, may be applied to the tire circumferentially around the crown of its tread. This will permit portions of the soft body of the tire to be forced into perforations 4 in the form of slight projections 5, which will hold the protector against movement laterally or circumferentially. The base may be an annular cap formed from a strip of material which is folded upon itself to form loops or pockets 6 at the edges of the base and may have its edges overlapping each other, as shown at 7, and is semicircular in cross-section. Contracting means, which I term the "cinches," for holding the protector in position upon the tire may be constructed in the form of separate retainers, as adjustable straining-wires 8, which fit within the pockets 6 and draw the opposite edges of the strip to form cinches of less diameter than the bulge of the tire to which the base is to be applied. I prefer to provide for each pocket two wires connected together by means of a union or connector in the form of a turnbuckle 9 or 91, a portion of the periphery of which is angular, as shown at 10, for the reception of a wrench. Portions of the base may be cut away or open, as shown at 11, to allow the insertion of the wires and turnbuckles and to permit the application of a wrench to adjust the turnbuckles, and, if desired, a slitted binding and cover 12, of more flexible material, as kid or light leather, may be secured at the opening for normally closing the same and concealing the turnbuckle and presenting a neater appearance and giving required strength where the canvas is open. I prefer to so arrange the retainers that the joints or connectors upon the opposite sides of each wheel will be relatively staggered. Preferably they will alternate with each other or occupy a position at the quadrants of the wheel or one-quarter of the way around the tire.

Secured to the base, substantially midway between its edges, so as to extend circumferentially around the wheel, is an armor or protecting-strip 13, desirably an indurated crown of center back sole-leather, which is secured at its edges by means of rows 14 of stitching or by pegs 141 or of both stitching and pegs, which extend through the strip and through thicknesses of the base. When stitching is used, the leather is preferably deeply creased or grooved, as at $a$, and the stitches are sunk or embedded therein, and by using a lock-stitch and waxing the thread the parts will be held together even though the outer portion of the threads may be worn off. By locating the threads in grooves at the edges of the crown of the tread they will not be exposed to wear until the armor-plate or strip is nearly worn out. The space between the strip 13 and the base 1 forms a pocket 15, within which may be placed a metallic band 16, which band may be formed from one or more pieces of material and extend entirely around the wheel and forms a practically impenetrable guard for the resilient tire. The space between the thickness of the base upon each side of the central portion may also form pockets 17, within which a metallic protector 18 in the form of a thin strip of sheet metal may be inserted for further protection of the internal pneumatic body of the tire.

In applying the protector to a pneumatic tire the wheel may be supported on an axle to turn freely and the pneumatic tire is deflated, and the retainers or cinch-wires upon one side of the protector are disconnected or let out by means of the turnbuckles to permit of the protector being slipped over the deflated tire and centered thereon. The retainers upon that side are then drawn up to correspond substantially with those of the other side, and the tire is then inflated to its full extent. The turnbuckles are then gradually tightened by successively passing around the wheel and giving each buckle a partial rotation. As each retainer is loose within its pocket, the strain applied by the turnbuckle will be evenly distributed around the wheel, and by arranging the turnbuckles upon the opposite sides of the wheel substantially at quadrants to each other the strain upon the two sides will be equally distributed, thereby drawing or cinching the protector around the wheel without uneven strain or pressure at any point. The protector is desirably of less circumference than the circumference of the fully-inflated tire, so that when it is in position it will naturally grip the tire with great force, which will be increased by the air-pressure and also by tightening the turnbuckles. When the tire is applied with cement or other liquid, such material is applied before the protector is placed in position and before the tire is inflated. Where the perforated retainers are used the cement may be entirely dispensed with. The retainer may be secured to the interior of the protector, as by means of cement; but I prefer to secure it by means of the stitching or pegging, which is extended through the base and the retainer. The edges of the protector are preferably extended nearly to the edges of the rim $c$ of the wheel, so that after the protector has been secured in position the cinch-wires will support the sides of the pneumatic tire, and thereby prevent rim chafing or cutting. This will also prevent the entrance of dust between the protector and the tire. When the cinch-wires are fully tightened, it is very difficult to force the edges of the protector away from the tire, even for the purpose of turning the turnbuckles. If it be desired at any time to remove the protector, it can be done by loosening the connectors to such an extent that the protector can be slipped off to one side of the wheel. By extending the protector to the rim of the wheel the entire outer surface of the tire may thus be protected and the tire virtually rendered indestructible, as all wear and tear will be taken up by the protector, and whenever the same becomes too much worn for further use it can be removed and a new one applied. When the protector is in place and the connectors tightened, the edges of the protector and the connectors therein are practically inelastic and it will be impossible for the protector to be moved laterally upon the tire after it has been secured in position, thereby giving the necessary strength to prevent displacement under the severe lateral strain caused in turning corners and in passing along inclined surfaces. Owing to the length of the protector around the tire and the rigidity with which it is held in position and the other means of securing the protector in place it will be impossible for the protector to move peripherally or circumferentially on the tire-body when the strain is applied to the wheel, as for propelling the vehicle.

The protector is desirably painted and varnished and colored to thereby give a neat appearance to the vehicle and to prevent moisture from penetrating to the tire. This also enables the color of the running-gear to be extended to the crown of the wheel.

As above described it is evident that the improved protector can be constructed in a substantial and inexpensive manner and that it can be readily applied to the ordinary wheels, either for a heavier vehicle, as automobiles, or for lighter vehicles, including the ordinary carriage and bicycle. It is also evident that changes and variations therein can be made, and I reserve the right to make such alterations as will come within the scope of my invention.

The protector as shown in the drawings consists practically in an annular case having contracted looped ends $d$ and having for said ends, respectively, adjustable running contractors, as the wires and their turnbuckles, in the loops to contract said ends. An advantage of having each of the ends of said case provided with independently-adjustable contractors is the ease of adjusting the case on the tire. The contractors may be formed of piano-wire or other wire of great tensile strength running freely in the loops or pockets. When the contractor on one side of the wheel has been drawn fairly tight, the final tightening may be completed by the other contractor, and the strain which is practically applied for holding the protector on the tire is so great that the turnbuckles of the character shown in Fig. VI are thereby drawn so forcibly against the tire that such turnbuckles cannot be turned, and for that reason I prefer to form one of the turnbuckles as shown at 91 in Fig. V, in which the adjacent ends of the wire segments are respectively provided with nuts $e$, into which the connector 91 is screwed. These nuts stand out sufficiently from the wire to allow the wrench to be applied to the connector after the forcible strain has been applied. For convenience a turnbuckle of this form is applied to the inner side of the wheel, so it is out of the way, and the other turnbuckles are desirably of the kind shown in Fig. VI. When the contractors are drawn taut, the sides of the case may be practically smooth and free from any cavities or projections where dust or dirt may accumulate. This smooth effect may be heightened by the use of rawhide for the loops or sections of the base, which may be applied and stretched perfectly tight while wet and then allowed to dry in place.

The base may be made of straight-woven canvas or may be composed of canvas woven into the desired form practically without seam and the open ends may be turned in to form the loops or pockets.

In use the sole-leather crown will become coated with earthy material picked up from the road and will thus be protected against wear. Said crown may be made in sections of any desirable length fastened at the ends by rivets $g$ to the steel or other metal strip or strips 16.

In order to afford the greatest possible protection against any liability to rim cutting or chafing, annular lagging $h$, of leather or other suitable material, may be applied to the inner side of the base, between the straining-wires and the resilient tire. The lagging may be of any desired thickness to give the required support.

It is deemed preferable to form the loops or pockets of only about the size required to allow the contractors to slip freely therein. They may readily be formed by rows $i$ of stitches through the base.

In the case of protectors for tires of bicycles or light carriages the contractors may be sufficiently malleable wire to allow them to be fastened and drawn taut by simply twisting the ends of the wires together at the four points of connection.

It is to be understood that the turnbuckles or the twisted ends of the wires or any other means of tightening the contractors may be employed within the pleasure of the constructor.

In place of leather I may use any other material having the substantial characteristics for this use and in using the term "leather" I include any such substitute.

Having described my invention, what I claim, and desire to secure by Letters Patent of the United States, is—

1. In a tire-protector, the combination, of an annular leather band adapted to form the tire-tread, with a strip of canvas folded upon itself with its edges overlapping at the midwidth, a second annular leather band between which said folded strip is inserted, means whereby said bands and strips are secured together, said second band provided with perforations in which the tire is adapted to embed, and means for holding said protector upon the tire.

2. In a tire-protector, the combination, of an annular leather band adapted to form the tire-tread, with a strip of canvas folded upon itself with its edges overlapping at the mid-length, a second annular leather band between which said folded strip is inserted, means whereby said bands are secured together, said second band perforated and adapted to embed into said tire, annular retainers in the pockets of said strip adapted to retain the same upon the tire, and means for adjusting said retainers.

3. In a tire-protector, the combination, of an annular leather band adapted to form the tire-tread, with a strip of canvas folded upon itself with its edges overlapping at the mid-width, a second annular leather band between which said folded strip is inserted, means whereby said bands and strips are secured together, said second band provided with perforations in which the tire is adapted to embed, an annular metallic band between said first-mentioned band and said strip, and means for holding said protector upon the tire.

4. In a tire-protector, the combination, of an annular leather band adapted to form the tire-tread, with a strip of canvas folded upon itself with its edges overlapping at the mid-length, a second annular leather band between which said folded strip is inserted, means whereby said bands are secured together, said second band perforated and adapted to embed into said tire, an annular metallic band between said first-mentioned band and said strip, annular retainers in the pockets of said strip adapted to retain the same upon the tire, and means for adjusting said retainers.

5. In a tire-protector, the combination, of a narrow annular indurated band adapted to form the tire-tread, a strip of canvas folded upon itself with its edges overlapping at the mid-length, a perforated annular band between which and the first-mentioned band said folded strip is inserted, means for uniting said bands and strip together, and adjustable annular retaining means.

In testimony whereof I have signed my name to this specification, in the presence of two subscribing witnesses, at Los Angeles, in the county of Los Angeles and State of California, this 7th day of July, 1902.

LINCOLN CLIFFORD CUMMINGS.

Witnesses:
JAMES R. TOWNSEND,
HANSON T. KENDALL.